United States Patent [19]

Tanaka

[11] Patent Number: 4,840,468

[45] Date of Patent: Jun. 20, 1989

[54] FOCUSING METHOD FOR ZOOM LENS

[75] Inventor: Tsunefumi Tanaka, Kanagawa, Japan

[73] Assignee: Canon Kabushiki Kaisha, Japan

[21] Appl. No.: 273,172

[22] Filed: Nov. 14, 1988

Related U.S. Application Data

[63] Continuation of Ser. No. 158,053, Feb. 12, 1988, abandoned, which is a continuation of Ser. No. 933,261, Nov. 19, 1986, abandoned, which is a continuation of Ser. No. 722,990, Apr. 15, 1985, abandoned, which is a continuation of Ser. No. 460,364, Jan. 24, 1983, abandoned.

[30] Foreign Application Priority Data

Feb. 8, 1982 [JP] Japan .................................. 57-18410

[51] Int. Cl.$^4$ .............................................. G02B 15/18
[52] U.S. Cl. ...................................... 350/427; 350/428
[58] Field of Search ................ 350/423, 427, 428, 430

[56] References Cited

U.S. PATENT DOCUMENTS 3,817,600  6/1974  Watanabe et al. ................... 350/428
4,198,126  4/1980  Abe et al. ............................. 350/430
4,516,839  5/1985  Tokumaru ........................... 350/427

Primary Examiner—Bruce Y. Arnold
Assistant Examiner—P. M. Dzierzynski
Attorney, Agent, or Firm—Toren, McGeady & Associates

[57] ABSTRACT

The disclosed zoom lens has at least three components and three components are made movable for zooming to different object distances by axially moving two of said components as a unit.

15 Claims, 6 Drawing Sheets

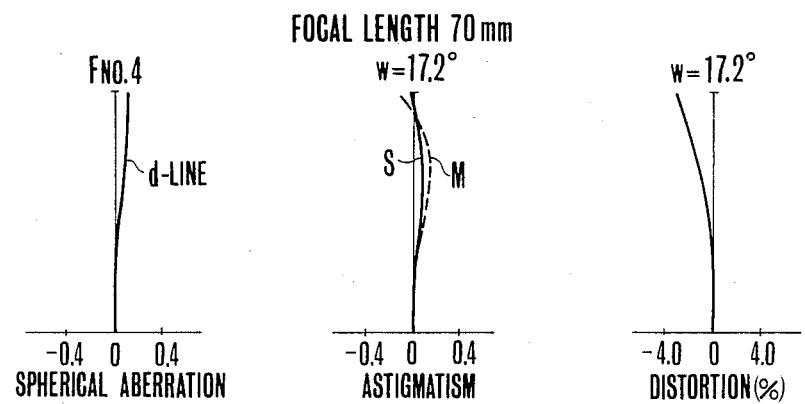
FIG.10A1  FIG.10A2  FIG.10A3
FOCAL LENGTH 70mm
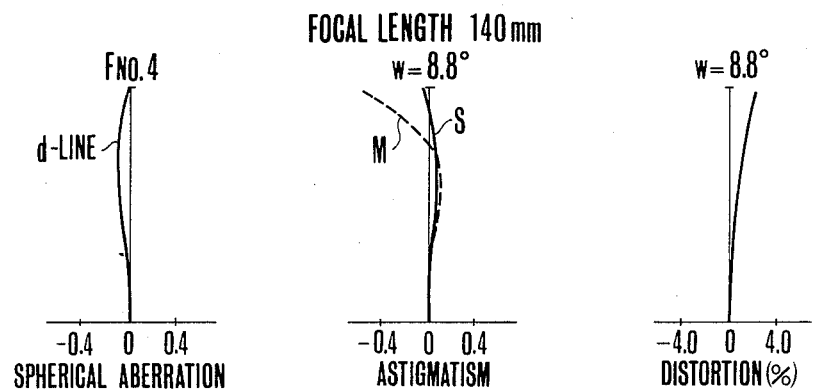
FIG.10A4  FIG.10A5  FIG.10A6
FOCAL LENGTH 140mm
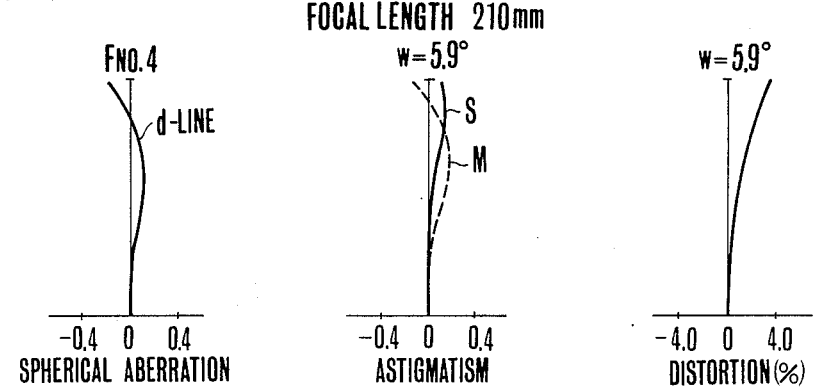
FIG.10A7  FIG.10A8  FIG.10A9
FOCAL LENGTH 210mm

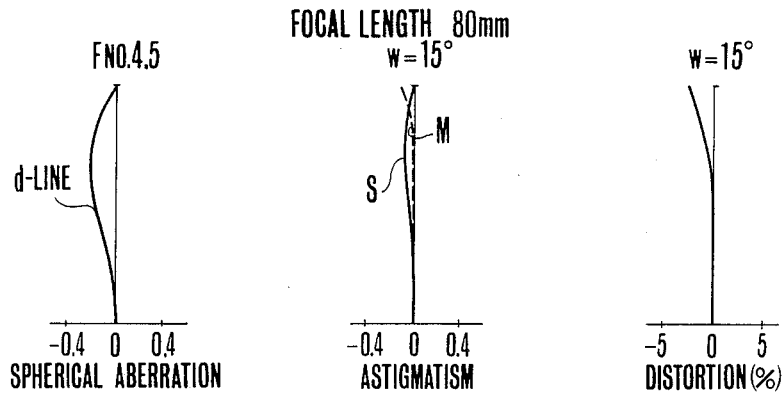
FIG.12A1  FIG.12A2  FIG.12A3
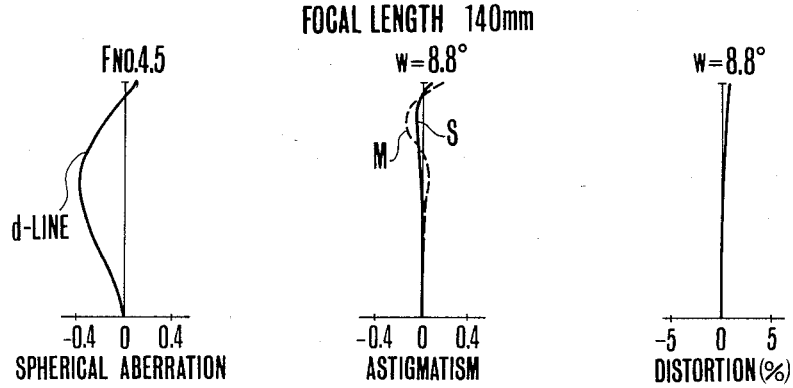
FIG.12A4  FIG.12A5  FIG.12A6
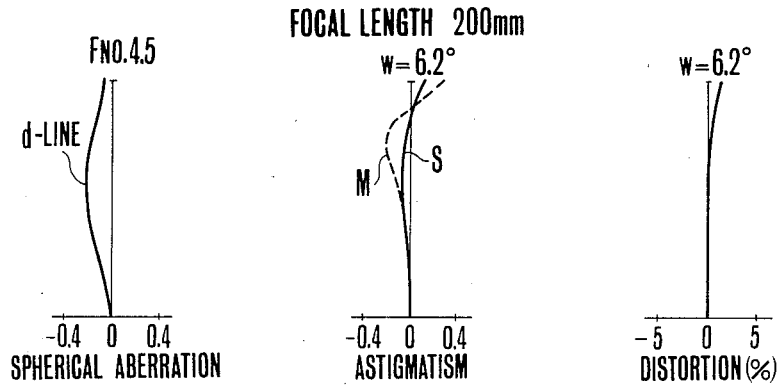
FIG.12A7  FIG.12A8  FIG.12A9

FOCUSING METHOD FOR ZOOM LENS

This is a continuation of application Ser. No. 158,053, filed Feb. 12, 1988, which in turn is a continuation of Ser. No. 933,261, filed Nov. 19, 1986, which in turn is a continuation of Ser. No. 722,990, filed Apr. 15, 1985, which in turn is a continuation of Ser. No. 460,364, filed Jan. 24, 1983, all now abandoned.

BACKGROUND OF THE INVENTION

1. Field of the Invention:

This invention relates to zoom lens focusing methods and more particularly to a focusing method using a lens group which is movable for zooming.

2. Description of the Prior Art:

Most conventional zoom lens focusing methods involve moving the frontmost lens component. Such a method is called the front focusing method. For example, there are four-component zoom lenses that focus at the first component, use the second component as the variator, the third component as the compensator and the fourth as an image forming component. Because this zoom lens configuration permits zooming without causing an earlier established in-focus condition to be broken, it has in the past found many uses in the various ratings of zoom lenses. Another system using the method is the so-called two-component zoom lens in which the first component of negative power and the second component of positive power form a zoom lens in which the components are moved in differential relation to effect zooming. When focusing, the first component is moved independently of the second one. After having been focused on an object at finite distances, zooming causes the sharpness of the image to change, more or less. This range of sharpness change is, however, so narrow as to constitute no problem in practical use. Therefore, two-component zoom lenses are popular along the above-mentioned four-component zoom lenses.

Nevertheless, the front focusing four-component zoom lens method has the following drawbacks:

(1) When focusing to shorter object distances, the front component is necessarily moved far ahead. For this purpose there is need to increase the diameter of the lens with a corresponding increase in the weight of the entire system.

(2) With the object at the closest distance, the height of incidence of the extra-axial ray on the lens surface becomes particularly high in wide angle positions, so that a rapid change in image aberrations is introduced.

(3) The foregoing two reasons prevent the focusing range from being extended very much towards the short side, so that for closeup photography a macro mechanism or other suitable supplementary means has to be used.

(4) The focusing lens moving block is positioned at the front of the lens mounting, so that the focusing lens is apt to change its position when the apparatus is subject to an outside its position when the apparatus is subject to outside shock.

(5) In an auto-focus camera the relatively heavy focusing lens and its operating mechanism make it difficult to maintain manageable proportions.

(6) The total movement of the focusing lens component is too great to avoid an over-load on the driving system in the auto-focus camera.

To eliminate the above-described drawbacks, it is necessary to employ some other focusing method than the front focusing one. Up to date, various proposals have been made.

Another focusing method for the above-described four component zoom lens is provided by moving the third lens component, which functions as the compensator, when zooming.

In this circumstance, with the third component, when moved to effect focusing, the required amount of axial movement of that component from a focusing position for an infinitely distant object, differs despite the same object distance, depending upon the zooming position.

To provide for focusing throughout the zoom components, or some component other than the first component gives the focusing movement a dependency on the zooming position. Therefore, focusing followed by zooming will break the in-focus condition, thus necessitating re-focusing. In order to compensate for the image shift resulting from focusing automatically during zooming, and to control the movement of the third component in accordance with both of the object distance and the focal length of the entire system, the operating mechanism must be provided with a cam of extremely complicated structure. It is, therefore, very difficult to manufacture mechanical mountings for such zoom lens economically with modern cam cutting techniques.

Zoom lenses having three components movable for zooming are described in U.S. Pat. Nos. 3,970,366 and 4,135,786 and Japanese Pat. Nos. Sho 39-6127 and 39-6432. With regard to the focusing through one of the zoom components, attention is invited to Japanese Laid-Open Pat. No. Sho 56-165107.

SUMMARY OF THE INVENTION

The present invention simplifies the change in the position of the focusing component for the same object distance with zooming despite the use of a front focusing method, and has for its general object to provide a focusing method for this type zoom lens system that is capable of adequately compensating in a simple way for deviation of the image plane.

To achieve this, according to the present invention, a feature of the zoom lens focusing method is employed in a zoom lens that has at least three components which include three lens components movable for zooming. Two of these zoom components are movable as a unit to effect focusing at different object distances. Moreover, it is preferable from a mechanical standpoint that these two lens components be mounted adjacent each other.

BRIEF DESCRIPTION OF THE DRAWINGS

FIGS. 10-A-1 through 10-A-9 and FIGS. 12-A-1 through 12-A-9 are graphic representations of the various aberrations of the lenses of FIGS. 9 and 11, respectively.

DETAILED DESCRIPTION OF THE PREFERRED EMBODIMENTS

Figure 1:
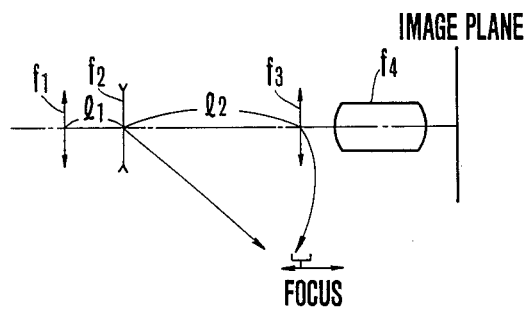
FIG. 1 is a schematic view of a four-component zoom lens optical system employing the conventional focusing method.

To better understand the invention under consideration, attention first is invited to the schematic prior art optical system that is shown in FIG. 1. Housing this 4-component zoom lens is accomplished by moving the third lens component, or compensator f3 when zooming. As shown, the lens also includes first, second and fourth lens components f1, f2 and f4, respectively. The focal lengths of these lens components f1, f2 and f3, moreover, also are, respectively F1, F2 and F3. Axial separation l1 is established between the lens components f1 and f2, with axial separation l2 being established between the lens components f2 and f3.

For illustrative purposes, focal lengths and lens component separation are as follows:

$$F1=100, F2=-34, F3=79.7, l1=10, l2=40$$

Figure 2:
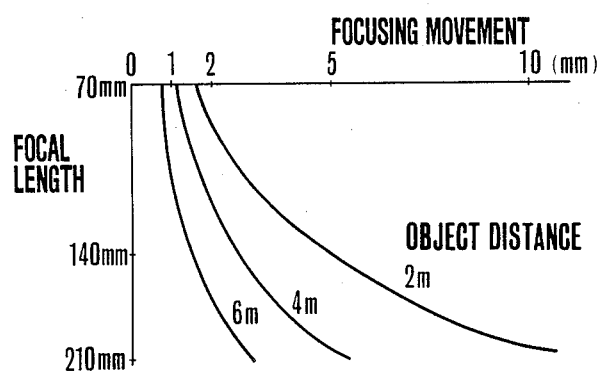
FIG. 2 is a graph illustrating a way in which the focusing component zoom lens of FIG. 1 moves.

FIG. 2 is a graph that shows the amount of axial movement that the third lens component f3 must undergo as a function of the object distances. Clearly, the third lens component f3, used for focusing, makes the focusing movement dependent on the zooming position.

The focusing method of the invention has its use in any type of zoom lens provided that when zooming, three lens components are moved in differential relation to each other, and when focusing, two of these three zoom components are made to move in fixed relation to each other while the other component remains stationary. In the following discussion, however, the present invention will be explained in connection with a particular zoom type suited to better achieve the object thereof. That is, the zoom lens shown in FIG. 3 comprises, from front to rear, a first lens group f1 having a positive refractive power, a second lens group f2 having a negative refractive power, a third lens group f3 having a positive refractive power and a fourth lens group f4 having a negative refractive power, wherein as zooming is performed from the wide angle to the telephoto positions, the second lens group f2 is moved rearward, while the third and fourth lens groups f3, f4 are simultaneousely moved in such a way as to expand the separation l3 therebetween, whereby the third and fourth lens groups are made to move when focusing. And, in such a further preferred embodiment, the paths in which the third and fourth lens groups f3, f4 move during zooming are made to differ as the object distance varies, thus permitting the third and fourth lens groups to move as a unit when focusing.

The method for focusing the above-described zoom lens according to an embodiment of the present invention are described in greater detail below.

With the third and fourth lens groups f3, f4 of refractive powers $\phi 3$ and $\phi 4$ respectively, when the axial separation l3 between these two lens groups varies $\Delta e$, the overall refractive power of $\phi$ of the two lens groups is caused to vary by:

$$\Delta \phi = -\Delta e \cdot \phi 3 \cdot \phi 4$$

When $\phi 3 > 0, \phi 4 < 0$, then for $\Delta e > 0$, it is in an optical system of $|\phi 3| > |\phi 4|$ that the overall refractive power becomes larger, and, as a result, that the use of these two lens groups when in focusing makes it possible to reduce the amount of movement thereof in telephoto positions. Also when the refractive powers of the third and fourth lens groups f3, f4 are of the same sign, an equivalent result can be obtained by narrowing the separation between the two lens groups. Further, even when the refractive powers of the third and fourth lens groups are of opposite sign and $|\phi 3| < |\phi 4|$, similarly the focusing movement in the telephoto positions can be reduced since the power distribution can be so set forth.

Figure 3:
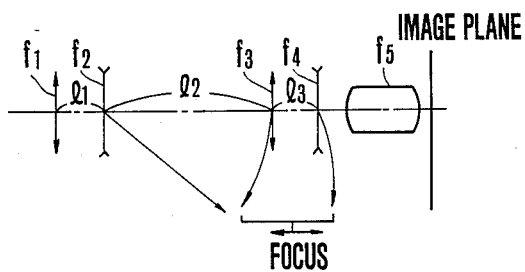
FIGS. 3, 5 and 7 are schematic views of an optical system operating in different ways for zooming that employ an embodiment of the focusing method of the invention.
Figure 5:
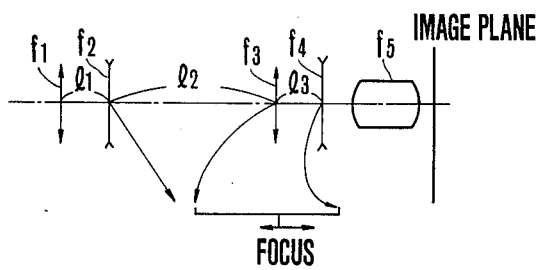

FIG. 3 and FIG. 5 schematically illustrate optical systems of different dimensions employing the focusing method of the invention, wherein the same reference characters are employed to denote the similar lens groups and their separations. An additional lens group is arranged in rear of the fourth lens group f4 to further facilitate good correction of aberrations. From the point of view of the essence of the invention use of the fifth lens group is not always necessary. The zoom lenses of FIGS. 3 and 5 have a factor $(\Delta \phi + \phi/\phi)$ taken at values of 1.38 and 2.05 respectively. The arrowed curves show the paths of movement of the zoom components when zooming, and the arrowed axial lines indicate the direction of focusing movement.

Figure 4:
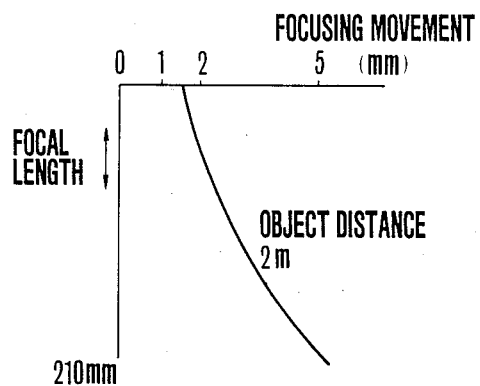
FIGS. 4 and 6 are graphs illustrating the focusing movement of the zoom lens of the invention as a function of the object distance and zooming position.
Figure 6:
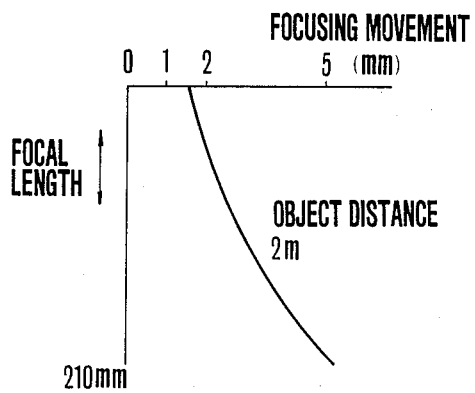

FIG. 4 is a graph that represents the distance the third and fourth lens groups f3, f4 of the system shown in FIG. 3 move from a point focused on an object at infinity when focusing is effected down to an object distance of 2 meters, as a fraction of the focal length of the entire system. FIG. 6 represents the same as applied to the optical system of FIG. 5.

As is evident through a comparison of FIGS. 4 and 6 with FIG. 2, the required amount of movement of the focusing lens groups for an object distance of 2 meters can be remarkably reduced. This is valid for other object distances. Another important fact is that the path of focusing movement becomes a simple curve, if not straight line. This contributes to a valuable decrease in the complexity of structure of the operating mechanism therefor. Particularly when applied to single lens reflex cameras having an automatic focusing function, such simplification of the path of movement of the lens groups for focusing and, moreover, the reduction in mechanical stress tends to reduce the load on the driving system and assure an increase in the accuracy of focusing control.

Unlike the front focusing method which provides good stability for spherical aberration and astigmatism simultaneously throughout the focusing range only with difficulty, the focusing method of the invention prevents the curvature of field of the image in the high zone of the image height from varying to excess with focusing, and stabilizes the spherical aberration sufficiently. In particular, correction of all aberrations for the telephoto positions becomes easy to perform, thereby giving an additional advantage in that the focusing range can be extended toward the short side.

It should be pointed out that the selection of the adjacent two of the zoom lens groups for employment as the focusing groups is particularly advantageous in simplifying the structure. It should be also pointed out that if an automatic focusing system is provided, because the load on that system becomes far smaller than that which was necessary in the prior art methods, another advantage is produced because the focusing adjustment can be accomplished more swiftly.

Figure 7:
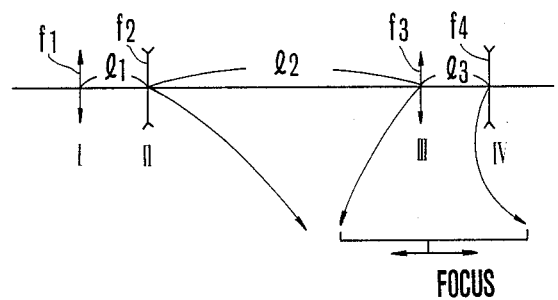

Next, in actual practice, the zoom lens having this focusing provision operates in such a way that after the in-focus condition has once been established in any zooming position, a subsequent zooming may be performed and the displacement of of the image point is so small as to be negligible. In this connection, the following explanation is given. Otherwise looking at FIGS. 2, 4 and 6, the ordinate can be considered to represent arithmetic focal length scale on the actuator, for example, a zoom ring. Then when the focal langth of the entire system is made to vary as a non-linear function of the movement, for example, rotation of the zoom ring, there is the possibility of producing a linear approximation to the focusing movement for a given object distance that corresponds to the movement of the zoom ring. In addition to this means, by employing the above-described means for varying the refractive power of the focusing lens groups with zooming, the focusing movement can be linearly approximated with sufficiently good accuracy over all object distances. In short the amount of movement of the zoom actuator and the amount of movement of the focusing lens groups can be made proportional to each other. FIG. 7 schematically illustrates an example of the zoom lens system adapted to satisfy the above-described proportional relationship wherein the same reference characters are employed to denote the similar optical elements to those shown in FIG. 1.

In a specific embodiment for the focal lengths F1 to F4 of the first to fourth lens groups f1 to f4 with the separations l1, l2 and l3 between the successive lens groups assumed to be taken at:

| | | |
|---|---|---|
| F1 = 100 | | |
| | | l1 = 17.9 |
| F2 = −28.57 | | |
| | | l2 = 41.9 |
| F3 = 40 | | |
| | | l3 = 15.9 |
| F4 = −59.9 | | | then when zooming from the wide angle side, the individual zoom lens groups have to move respective distances listed below:

| 2nd Group | 3rd Group | 4th Group | Focal Length of Entire System |
|---|---|---|---|
| 0.0 | 0.0 | 0.0 | 98.4 |
| 2.035 | −0.603 | 1.025 | 107.1 |
| 3.596 | −0.980 | 1.897 | 114.2 |
| 4.912 | −1.251 | 2.679 | 120.5 |
| 6.072 | −1.460 | 3.389 | 126.4 |
| 7.120 | −1.629 | 4.068 | 132.0 |
| 8.085 | −1.770 | 4.697 | 137.3 |
| 8.982 | −1.893 | 5.293 | 142.5 |
| 9.825 | −2.001 | 5.859 | 147.6 |
| 10.622 | −2.099 | 6.399 | 152.6 |
| 11.380 | −2.190 | 6.914 | 157.5 |
| 12.105 | −2.275 | 7.408 | 162.4 |
| 12.799 | −2.357 | 7.882 | 167.2 |
| 13.468 | −2.437 | 8.337 | 172.0 |
| 14.113 | −2.516 | 8.775 | 176.8 |
| 14.737 | −2.595 | 9.195 | 181.6 |
| 15.342 | −2.674 | 9.600 | 186.4 |
| 15.929 | −2.754 | 9.990 | 191.2 |
| 16.500 | −2.836 | 10.364 | 196.0 |
| 17.056 | −2.920 | 10.725 | 200.8 | where all the dimensions are in millimeters, and the direction in which light advances is taken as positive.

Figure 8:
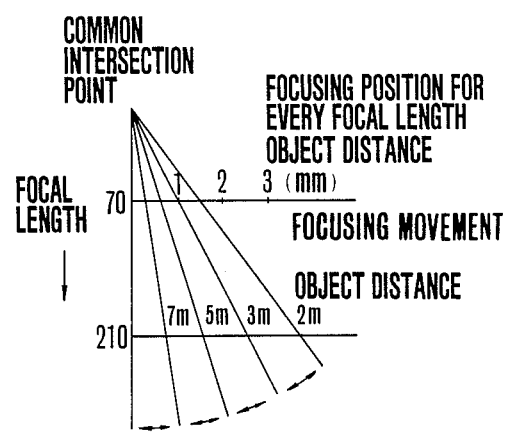
FIG. 8 is a diagram of geometry considered to define the movement of the focusing lens component in relation to the amount of rotation of the zoom actuator when the focusing method of the invention is applied to the zoom lens of FIG. 7.

FIG. 8 illustrates how to linearize the focusing movement of the zoom lens system of FIG. 7 over all object distances as a function of the rotation of the zoom ring.

In the zoom lens system of FIG. 7, when a focusing control device is constructed in mechanical form, it becomes possible to compensate for the displacement of the image plane that is a consequence of zooming after focusing by only one linear cam for every object distance. In contrast to this, the conventional zoom lens when designed to attain an equivalent result will require the use of a non-linear cam that is machined in a control sleeve of the lens mounting through very difficult production techniques. In comparison with this, the zoom lens system according to the present invention can be operated to focus very advantageously.

It should be pointed out again that though focusing of the zoom lens system according to the present invention is operated approximately, it has been found that such approximation meets the requirement of attaining as high an accuracy of focusing control as acceptable in actual practice. For example, the following table lists the numerical values of the distances the image plane is shifted during zooming with an object at a distance 2, 4 or 6 meters, provided that the zoom lens system of FIG. 7 operates with linear movement of the focusing lens group.

| Focal Length | Object Distance | | |
|---|---|---|---|
| | 2 m | 4 m | 6 m |
| 98.4 | −0.132 | −0.116 | −0.090 |
| 107.1 | −0.032 | −0.068 | −0.058 |
| 114.2 | 0.022 | −0.046 | −0.041 |
| 120.5 | 0.051 | −0.029 | −0.032 |
| 126.4 | 0.064 | −0.023 | −0.028 |
| 132.0 | 0.066 | −0.022 | −0.028 |
| 137.3 | 0.059 | −0.025 | −0.030 |
| 142.5 | 0.047 | −0.031 | −0.033 |
| 147.6 | 0.032 | −0.037 | −0.038 |
| 152.6 | 0.014 | −0.045 | −0.042 |
| 157.5 | −0.004 | −0.052 | −0.046 |
| 162.4 | −0.021 | −0.058 | −0.050 |
| 167.2 | −0.036 | −0.062 | −0.052 |
| 172.0 | −0.049 | −0.064 | −0.053 |
| 176.8 | −0.057 | −0.064 | −0.051 |
| 181.6 | −0.060 | −0.060 | −0.047 |
| 186.4 | −0.057 | −0.052 | −0.041 |
| 191.2 | −0.046 | −0.040 | −0.031 |
| 196.0 | −0.028 | −0.023 | −0.017 |
| 200.8 | 0.0 | 0.0 | 0.0 |

In the above table, the minus values of defocus from the ideal image plane indicate shifts toward the front, and the unit is in millimeters. As is evident from this table, it is understandable that for the disc of least confusion is 0.035 mm in diameter, as the axial depth becomes 0.158, the linear approximation is allowable when focusing.

As in the above, according to the present invention, the employment of another focusing method beside the front focusing method makes possible manufacturing mounting mechanisms for zoom lens systems through similar production techniques to those adapted to the conventional or front focusing method while nevertheless eliminating the drawbacks of the front focusing method.

Other variations of the focusing method of the invention as applied to, for example, 5- and 6- component zoom lenses are possible within the scope and spirit of the invention, as a matter of course.

EXAMPLE 2

| F = 80–200  FNO = 1:4.5 | | | | | | |
|---|---|---|---|---|---|---|
| 1st Group | R1 = 131.877 | D1 = 5.60 | N1 = 1.84666 | ν1 = 23.9 |
|  | R2 = 76.724 | D2 = 10.24 | N2 = 1.60311 | ν2 = 60.7 |
|  | R3 = 966.483 | D3 = 0.96 | | |
|  | R4 = 88.589 | D4 = 8.24 | N3 = 1.51742 | ν3 = 52.4 |
|  | R5 = −671.294 | D5 = Variable | | |
| 2nd Group | R6 = 300.245 | D6 = 2.21 | N4 = 1.78590 | ν4 = 44.2 |
|  | R7 = 60.750 | D7 = 4.28 | | |
|  | R8 = −52.242 | D8 = 2.60 | N5 = 1.69680 | ν5 = 55.5 |
|  | R9 = 32.218 | D9 = 5.60 | N6 = 1.80518 | ν6 = 25.4 |
|  | R10 = 97.088 | D10 = Variable | | |
| 3rd Group | R11 = 252.127 | D11 = 5.93 | N7 = 1.51823 | ν7 = 59.0 |
|  | R12 = −54.516 | D12 = 0.98 | | |
|  | R13 = 58.858 | D13 = 8.68 | N8 = 1.51633 | ν8 = 64.1 |
|  | R14 = −42.624 | D14 = 3.27 | N9 = 1.84666 | ν9 = 23.9 |
|  | R15 = −82.703 | D15 = Variable | | |
| 4th Group | R16 = −186.941 | D16 = 1.90 | N10 = 1.71300 | ν10 = 53.8 |
|  | R17 = 28.116 | D17 = 5.01 | N11 = 1.62004 | ν11 = 36.3 |
|  | R18 = 93.703 | D18 = Variable | | |
| Image Forming Lens Group | R20 = 30.471 | D20 = 4.50 | N12 = 1.71300 | ν12 = 53.8 |
|  | R21 = 326.572 | D21 = 5.32 | | |
|  | R22 = −235.626 | D22 = 1.86 | N13 = 1.76182 | ν13 = 26.6 |
|  | R23 = 68.493 | D23 = 48.41 | | |
|  | R24 = −19.424 | D24 = 1.94 | N14 = 1.79952 | ν14 = 42.2 |
|  | R25 = −39.764 | D25 = 0.10 | | |
|  | R26 = 137.703 | D26 = 6.05 | N15 = 1.59551 | ν15 = 39.2 |
|  | R27 = −42.030 | | | |

Two specific examples of the zoom lens system of FIG. 3 can be constructed in accordance with the numerical data given in the following tables for the radii of curvature, R, the axial thicknesses and air separations, D, and the refractive indices, N, and the Abbe numbers, $\nu$, of the glasses of the lens elements with the usual subscripts numbered consecutively from front to rear.

Figure 9:
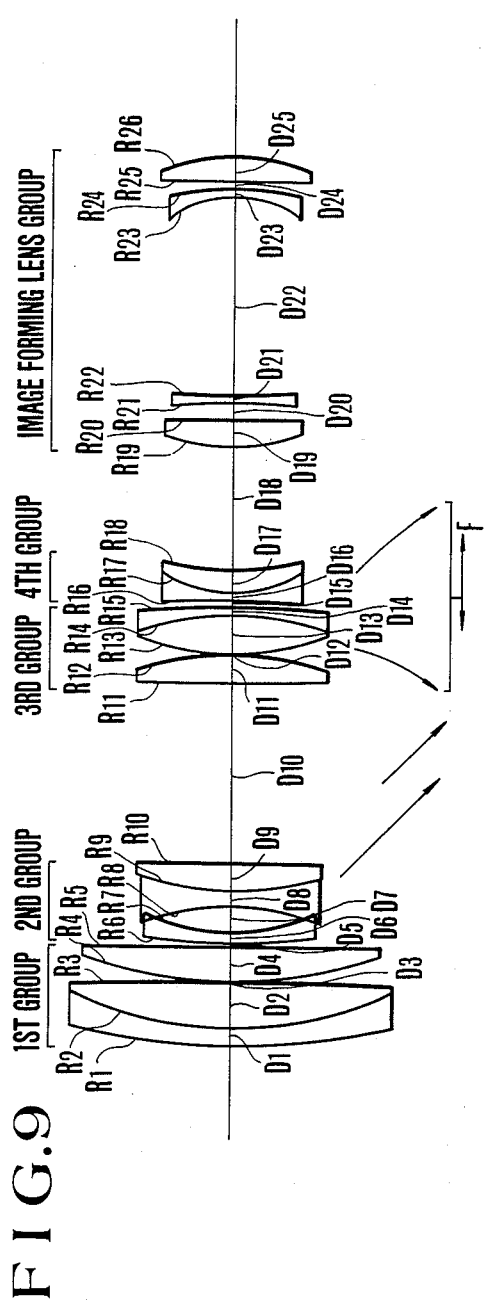
FIGS. 9 and 11 are lens block diagrams of specific zoom lenses that characterize the invention.
Figure 11:
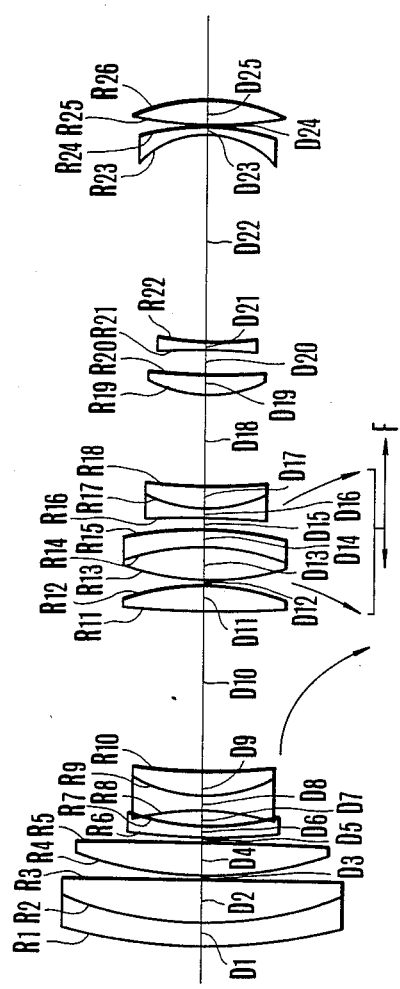

Numerical example 1 of the lens in a longitudinal section view is illustrated in FIG. 9 with its all aberrations in FIGS. 10-A-1 through 10-A-9, and numerical example 2 of the lens in a longitudinal section view is illustrated in FIG. 11 with its all aberrations in FIGS. 12-A-1 through 12-A-9.

EXAMPLE 1

| F = 70–210  FNO 4.0 | | | | | |
|---|---|---|---|---|---|
| 1st Group | G1 R1 = 146.000 | D1 = 3.52 | N1 = 1.805 | ν1 = 25.4 |
|  | G2 R2 = 75.283 | D2 = 9.80 | N2 = 1.603 | ν2 = 60.7 |
|  | R3 = −1278.793 | D3 = 0.10 | | |
|  | G3 R4 = 86.629 | D4 = 7.30 | N3 = 1.517 | ν3 = 52.4 |
|  | R5 = −4322.844 | D5 = Variable | | |
| 2nd Group | G4 R6 = 206.966 | D6 = 1.75 | N4 = 1.713 | ν4 = 53.8 |
|  | R7 = 39.207 | D7 = 6.46 | | |
|  | G5 R8 = −41.474 | D8 = 2.55 | N5 = 1.713 | ν5 = 53.8 |
|  | G6 R9 = 52.157 | D9 = 5.87 | N6 = 1.847 | ν6 = 23.9 |
|  | R10 = −936.310 | D10 = Variable | | |
| 3rd Group | G7 R11 = 207.713 | D11 = 6.20 | N7 = 1.613 | ν7 = 58.7 |
|  | R12 = −56.249 | D12 = 0.20 | | |
|  | G8 R13 = 55.537 | D13 = 8.20 | N8 = 1.516 | ν8 = 64.1 |
|  | G9 R14 = −56.835 | D14 = 1.79 | N9 = 1.847 | ν9 = 23.9 |
|  | R15 = −219.576 | D15 = Variable | | |
| 4th Group | G10 R16 = −106.382 | D16 = 1.27 | N10 = 1.583 | ν10 = 46.4 |
|  | G11 R17 = 25.295 | D17 = 5.29 | N11 = 1.651 | ν11 = 38.3 |
|  | R18 = 64.267 | D18 = Variable | | |
| Image Forming Lens Group | G12 R19 = 35.794 | D19 = 5.35 | N12 = 1.613 | ν12 = 58.7 |
|  | R20 = 1368.672 | D20 = 3.52 | | |
|  | G13 R21 = −313.786 | D21 = 1.80 | N13 = 1.805 | ν13 = 25.4 |
|  | R22 = 268.288 | D22 = 42.11 | | |
|  | G14 R23 = −19.627 | D23 = 1.80 | N14 = 1.800 | ν14 = 42.2 |
|  | R24 = −44.743 | D24 = 1.55 | | |
|  | G15 R25 = −238.231 | D25 = 5.18 | N15 = 1.699 | ν15 = 30.1 |
|  | R26 = −35.201 | | | |

What I claim:
1. A zoom lens comprising:
a first lens component, stationary during focusing;
a second lens component;
a third lens component; and
a fourth lens component, said third and fourth lens components moving as a unit when focusing is made, and moving in such a manner that their overall refractive power varies when zooming is made, said second lens component being movable simultaneously with said third lens component and said fourth lens component during zooming and being stationary during focusing, wherein the movement of said third and fourth lens components relative to a given object distant is substantially linear over the whole range of variation in focal length and substantially linear relative to all object distances focusable by the movement of the third and fourth lens components.

2. A zoom lens according to claim 1, wherein said third lens component is positioned between said fourth and second lens components.

3. A zoom lens according to claim 2, wherein the combined refractive power of said third and fourth lens components increases when zooming from the wide angle to the telephoto position.

4. A zoom lens according to claim 3, wherein said second lens component moves non-linearly when zooming.

5. A zoom lens according to claim 4, wherein said fourth lens component lies on the image side of said third lens component, and said second lens component lies on the object side of said third lens component.

6. A zoom lens according to claim 5, wherein said third lens component has a positive refractive power, said fourth lens component has a negative refractive power, and the separation between said third and fourth lens components increases when zooming from the wide angle to the telephoto position.

7. A zoom lens according to claim 6, wherein said second lens component has a negative refractive power and moves rearward during zooming from the side angle to the telephoto position.

8. A zoom lens according to claim 7, wherein said first lens component is positioned on the object side of said second lens component and has positive refractive power.

9. A zoom lens comprising:
a first lens group stationary during focusing;
a second lens group located closer to an image than said first lens group; and
a plurality of lens groups which move to change their relative positional relation so as to change their compound refractive power during zooming and move together during focusing, said second lens group being positioned on the object side of said plurality of lens groups for moving in the direction of the optical axis during zooming and stationary during focusing, wherein the movement of said plurality of lens groups is substantially linear relative to all objective distances focusable by the lens groups movable for focusing over the whole range of variation in focal length.

10. A zoom lens according to claim 9, wherein the lens group other than those used for focusing, moves non-linearly during the zooming process.

11. A zoom lens according to claim 9, wherein the distance between lens groups for focusing vary such as to increase their compound refractive power during zooming from the wide angle to the telephoto position.

12. A zoom lens according to claim 11, wherein one of the lens groups for focusing has a positive refractive power while the other lens group has a negative refractive power and the lens distance therebetween increases as zooming occurs from the wide angle to the telephoto position.

13. A zoom lens according to claim 9, wherein two out of three lens groups are positioned at the image side and move for focusing.

14. A zoom lens according to claim 13, wherein the three lens groups have respectively, negative, positive and negative refractive power, as counted from the object side.

15. A zoom lens according to claim 9, further comprising:
a lens group which is in a fixed position during focusing and is provided in front of the three lens groups which move for zooming.

* * * * *